United States Patent
Kim et al.

(10) Patent No.: US 7,653,393 B2
(45) Date of Patent: Jan. 26, 2010

(54) METHOD AND SYSTEM FOR FORMING AND TRANSMITTING/RECEIVING NEIGHBOR BASE STATION INFORMATION IN A BWA COMMUNICATION SYSTEM

(75) Inventors: Jun-Hyung Kim, Seoul (KR); Tae-Won Kim, Yongin-si (KR); Hong-Sung Chang, Suwon-si (KR); Yong Chang, Seongnam-si (KR); Geun-Hwi Lim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 97 days.

(21) Appl. No.: 11/205,738

(22) Filed: Aug. 17, 2005

(65) Prior Publication Data

US 2006/0040699 A1 Feb. 23, 2006

(30) Foreign Application Priority Data

Aug. 17, 2004 (KR) .................. 10-2004-0064901
Aug. 31, 2004 (KR) .................. 10-2004-0069178

(51) Int. Cl.
*H04W 36/00* (2006.01)
*H04W 4/00* (2006.01)

(52) U.S. Cl. ................ 455/437; 455/434; 370/331

(58) Field of Classification Search ............ 455/434, 455/524, 67.11, 433, 432.1, 414.1, 414.2, 455/517, 432.2, 432.3, 435.1, 436, 437, 438, 455/439, 442, 450, 451, 452.1, 452.2, 453; 370/338, 913, 471, 474, 310, 328

See application file for complete search history.

(56) References Cited

U.S. PATENT DOCUMENTS

| | | | | |
|---|---|---|---|---|
| 5,128,926 A | * | 7/1992 | Perlman et al. ............. | 370/248 |
| 5,396,490 A | * | 3/1995 | White et al. ................ | 370/474 |
| 5,440,545 A | * | 8/1995 | Buchholz et al. ........... | 370/426 |
| 5,574,860 A | * | 11/1996 | Perlman et al. ............. | 709/220 |
| 5,657,317 A | * | 8/1997 | Mahany et al. .............. | 370/338 |
| 5,948,080 A | * | 9/1999 | Baker .......................... | 710/37 |
| 6,141,550 A | * | 10/2000 | Ayabe et al. ................ | 455/433 |
| 6,249,669 B1 | * | 6/2001 | Ogino et al. ............... | 455/63.1 |
| 6,421,328 B1 | * | 7/2002 | Larribeau et al. .......... | 370/329 |
| 6,542,741 B2 | * | 4/2003 | Wallstedt et al. ........... | 455/434 |

(Continued)

FOREIGN PATENT DOCUMENTS

SU 2 121 230 9/1992

(Continued)

*Primary Examiner*—George Eng
*Assistant Examiner*—Christopher M Brandt
(74) *Attorney, Agent, or Firm*—The Farrell Law Firm, LLP

(57) ABSTRACT

Disclosed is a method and system for forming and transmitting to an MS a broadcast message for notifying information of neighbor BSs in a BWA communication system. The method includes scanning neighbor base stations adjacent to the serving base station, collecting information of the scanned neighbor base stations, comparing a size of the information of the scanned neighbor base stations with a size of a frame for carrying the information of the neighbor base stations constructing at least one broadcast message that includes the information of the neighbor base stations according to a result of the comparison, setting up fields of the constructed broadcast message according to information included in the constructed broadcast message and broadcasting the broadcast message including the setup fields.

8 Claims, 3 Drawing Sheets

U.S. PATENT DOCUMENTS

| | | | |
|---|---|---|---|
| 6,882,842 B2* | 4/2005 | Stephan et al. | 455/434 |
| 7,151,934 B2* | 12/2006 | Nishimura et al. | 455/442 |
| 2003/0045300 A1* | 3/2003 | New | 455/455 |
| 2003/0134622 A1* | 7/2003 | Hsu et al. | 455/414 |
| 2003/0210710 A1* | 11/2003 | Odman | 370/471 |
| 2003/0236090 A1* | 12/2003 | Jao et al. | 455/424 |
| 2004/0015717 A1 | 1/2004 | Colas et al. | |
| 2004/0047331 A1* | 3/2004 | Jang | 370/346 |
| 2004/0131014 A1* | 7/2004 | Thompson et al. | 370/230 |
| 2004/0152492 A1* | 8/2004 | Gray | 455/562.1 |
| 2004/0176094 A1 | 9/2004 | Kim et al. | |
| 2004/0185853 A1 | 9/2004 | Kim et al. | |
| 2005/0090250 A1* | 4/2005 | Backes | 455/434 |
| 2006/0025079 A1* | 2/2006 | Sutskover et al. | 455/67.11 |
| 2006/0153133 A1* | 7/2006 | Zhong | 370/331 |
| 2006/0153232 A1* | 7/2006 | Shvodian | 370/468 |
| 2008/0039107 A1* | 2/2008 | Ma et al. | 455/450 |

FOREIGN PATENT DOCUMENTS

| | | |
|---|---|---|
| WO | WO 99/59293 | 11/1999 |
| WO | WO 01/33772 | 5/2001 |

* cited by examiner

METHOD AND SYSTEM FOR FORMING AND TRANSMITTING/RECEIVING NEIGHBOR BASE STATION INFORMATION IN A BWA COMMUNICATION SYSTEM

PRIORITY

This application claims priority to applications entitled "Method For Forming And Transmitting/Receiving Neighbor Base Station Information In A BWA Communication System" filed in the Korean Industrial Property Office on Aug. 17 and 31, 2004 and assigned Serial Nos. 2004-64901 and 2004-69178, respectively, the contents of each of which are hereby incorporated by reference.

BACKGROUND OF THE INVENTION

1. Field of the Invention

The present invention relates to a Broadband Wireless Access (BWA) communication system, and more particularly to a method and a system for forming and transmitting/receiving neighbor Base Station (BS) information in order for a serving BS to send the neighbor BS information to a Mobile Station (MS) in a BWA communication system.

2. Description of the Related Art

The communication system was initially developed for the purpose of voice service and is now being developed to provide data service and various multimedia services. However, the communication system developed for voice service has a relatively narrow bandwidth for data transmission and requires relatively expensive service charges, it cannot meet rapidly increasing user demands for various services. Further, the necessity for a communication system capable of efficiently providing Internet service is now increasing due to increasing demands for the Internet service together with the development in the communication industry. To this end, a Broadband Wireless Access (BWA) communication system, which has a broad enough bandwidth to meet rapidly increasing user demands and efficiently provide the Internet service, has been introduced.

The BWA communication system is a communication system for supporting not only the voice service but also various data services of low and high speed and multimedia application services for providing high quality moving images, etc. The BWA communication system supports access to the Public Switched Telephone Network (PSTN), Packet Switched Data Network (PSDN), Internet network, International Mobile Telecommunication (IMT)-2000 network, Asynchronous Transfer Mode (ATM) network, etc. in a mobile or stationary environment based on wireless media using a broadband, and supports a high speed channel data rate. The BWA communication system can be classified into a broadband wireless subscriber network, a broadband mobile access network, and high speed wireless Local Area Network (LAN), according to the mobility (stationary or mobile) of a Subscriber Station (SS), the communication environment (outdoor or indoor), and the channel data rate.

Meanwhile, 802.16 standardization group of Institute of Electrical and Electronics Engineers (IEEE), which is one of international standardization organizations, is arranging standards for wireless access schemes of the BWA communication system, and specifically, is now driving to establish an IEEE 802.16d standard for providing a broadband wireless Internet service to a stationary SS. The 802.16 system does not account for the mobility of the SS.

A BWA system according to the IEEE 802.16d standard has a wider bandwidth for data transmission and thus can transmit a much larger quantity of data in a short time, in comparison with the conventional wireless technology for voice service. Further, in the BWA system according to the IEEE 802.16d standard, all of the users can share a channel, thereby achieving efficient use of the channel. Further, the BWA system according to the IEEE 802.16d standard can guarantee various Quality of Service (QoS) and thus can provide a user with services of different qualities according to the characteristics of service. In the IEEE 802.16d system, all of the users connected to the BS share a common channel, so the BS allocates intervals of the common channel for use by each user during every uplink and downlink frame. Therefore, the BS must send uplink and downlink access information to the users every frame in order to enable the users to share the channel. To this end, in the IEEE 802.16d system, channels are divided into uplink channel and downlink channel, information about each channel is defined according to Type, Length and Value (TLV), and the defined information is then inserted to Downlink Channel Descriptor (DCD) and Uplink Channel Descriptor (UCD) messages which are transmitted to all of the users, so that characteristic information about the channels is sent to the SS.

Further, the IEEE 802.16 standardization group is now driving to establish an IEEE 802.16e standard for providing mobility to an SS of the IEEE 802.16d communication system. The IEEE 802.16e communication system has a wider bandwidth for data transmission and thus can transmit a much larger quantity of data in short time, in comparison with the conventional wireless technology for voice service. Further, in the IEEE 802.16e communication system, all of the users can share a channel, thereby achieving efficient use of the channel. Also, the IEEE 802.16e communication system can guarantee various Quality of Service (QoS) and thus can provide a user with services of difference qualities according to the characteristics of service. The IEEE 802.16e communication system supports handoff, thereby guaranteeing the mobility of a Mobile Station (MS).

In order to support the mobility of an MS, a BS of the IEEE 802.16e communication system periodically broadcasts a mobile neighbor advertisement (MOB_NBR-ADV) message that includes neighbor BS information to all MSs within a cell controlled by the BS, thereby sending status information of the neighbor cells to the MSs. Specifically, when an MS located within one cell moves to a neighbor cell, the MS can preliminarily obtain information of a neighbor BS of the neighbor cell (i.e. a BS controlling the neighbor cell), such as a network ID, channel characteristics, etc. of the neighbor BS, by receiving the MOB_NBR-ADV message broadcast by the serving BS which controls the current cell in which the MS is currently located. Therefore, the IEEE 802.16e communication system can support handoff of the MS.

However, in the IEEE 802.16e communication system, when the serving BS has too many neighbor cells or the neighbor cells have capacities much different from the capacity of the current cell, the quantity of the neighbor BS information transmitted from the serving BS to the MSs becomes too much, so that the MOB_NBR-ADV message transmitted from the serving BS to the MSs becomes too large. When the serving BS has too much neighbor BS information, it is impossible to transmit all of the information in one frame. In other words, the MOB_NBR-ADV message including all the neighbor BS information becomes too large and thus cannot be transmitted in one frame. In the IEEE 802.16e communication system, a BS cannot fragment a Medium Access Control (MAC) management message to transmit the message.

SUMMARY OF THE INVENTION

Accordingly, the present invention has been made to solve at least the above-mentioned problems occurring in the prior art, and an object of the present invention is to provide a method and system for forming and transmitting/receiving a broadcast message for sending information of neighbor BSs to an MS in a BWA communication system.

It is another object of the present invention to provide a method and system for fragmenting and transmitting/receiving a broadcast message for sending information of neighbor BSs to an MS in a BWA communication system.

In order to accomplish this object, there is provided a method for transmitting neighbor base station information by a serving base station in a broadband wireless access communication system in which the serving base station broadcasts the neighbor base station information to a mobile station, the method includes the steps of scanning neighbor base stations adjacent to the serving base station, collecting information of the scanned neighbor base stations, and comparing a size of the information of the scanned neighbor base stations to a size of a frame for carrying the information of the neighbor base stations constructing at least one broadcast message including the information of the neighbor base stations according to a result of the comparison and setting up fields of the constructed broadcast message according to the information included in the constructed broadcast message and broadcasting the broadcast message including the setup fields.

In accordance with another aspect of the present invention, there is provided a method for receiving neighbor base station information by a mobile station in a broadband wireless access communication system in which a serving base station broadcasts the neighbor base station information to the mobile station, the method includes the steps of receiving a first broadcast message transmitted from the serving base station by the mobile station obtaining information of neighbor base stations included in the first broadcast message and determining from the obtained information if the first broadcast message is a fragmented broadcast message and receiving at least one more fragmented broadcast message transmitted from the serving base station when the first broadcast message is a fragmented broadcast message.

In accordance with another aspect of the present invention, there is provided a method for forming neighbor base station information by a serving base station in a broadband wireless access communication system in which the serving base station broadcasts the neighbor base station information to a mobile station, the method includes the steps of scanning neighbor base stations adjacent to the serving base station, collecting information of the scanned neighbor base stations, and comparing a size of the information of the scanned neighbor base stations with a size of a frame for carrying the information of the neighbor base stations and constructing at least one broadcast message including the information of the neighbor base stations according to a result of the comparison and setting up fields of the constructed broadcast message according to information included in the constructed broadcast message.

In accordance with another aspect of the present invention, there is provided a method for transmitting and receiving neighbor base station information in a broadband wireless access communication system in which a serving base station broadcasts the neighbor base station information to a mobile station, the method includes the steps of scanning neighbor base stations adjacent to the serving base station, collecting information of the scanned neighbor base stations, comparing a size of the information of the scanned neighbor base stations with a size of a frame for carrying the information of the neighbor base stations, constructing at least one broadcast message including the information of the neighbor base stations according to a result of the comparison, setting up fields of the constructed broadcast message according to information included in the constructed broadcast message, and broadcasting by the serving base station the broadcast message including the setup fields, and receiving the broadcast message transmitted from the serving base station by the mobile station, obtaining information of neighbor base stations included in the broadcast message and determining from the obtained information if the broadcast message is a fragmented broadcast message, and receiving by the mobile station at least one more fragmented broadcast message transmitted from the serving base station when the broadcast message is a fragmented broadcast message.

In accordance with another aspect of the present invention, there is provided a system for transmitting and receiving neighbor base station information in a broadband wireless access communication system in which a serving base station broadcasts the neighbor base station information to a mobile station, the system includes a serving base station for scanning neighbor base stations adjacent to the serving base station, collecting information of the scanned neighbor base stations, comparing a size of the information of the scanned neighbor base stations with a size of a frame for carrying the information of the neighbor base stations, constructing at least one broadcast message including the information of the neighbor base stations according to a result of the comparison, setting up fields of the constructed broadcast message according to information included in the constructed broadcast message, and broadcasting the broadcast message including the setup fields and a mobile station for receiving the broadcast message transmitted from the serving base station by the mobile station, obtaining information of neighbor base stations included in the broadcast message and determining from the obtained information if the broadcast message is a fragmented broadcast message, and receiving at least one more fragmented broadcast message transmitted from the serving base station when the broadcast message is a fragmented broadcast message.

In accordance with another aspect of the present invention, there is provided a system for forming neighbor base station information by a serving base station in a broadband wireless access communication system in which the serving base station broadcasts the neighbor base station information to a mobile station, the system includes a serving base station for scanning neighbor base stations adjacent to the serving base station, collecting information of the scanned neighbor base stations, comparing a size of the information of the scanned neighbor base stations with a size of a frame for carrying the information of the neighbor base stations, constructing at least one broadcast message including the information of the neighbor base stations according to a result of the comparison, and setting up fields of the constructed broadcast message according to information included in the constructed broadcast message.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention rather unclear.

As described here, the present invention proposes a method and system for forming a broadcast message, specifically a mobile neighbor advertisement (MOB_NBR-ADV) message, for transmitting neighbor BS information from a serving BS (a BS currently providing service to an MS) to the MS in order to support handoff of the MS in a BWA communication system. Further, the present invention proposes a method and system for transmitting and receiving the MOB_NBR-ADV message including the neighbor BS information in a BWA communication system. The present invention proposes a method and system for constructing a MOB_NBR-ADV message through fragmentation and then transmitting the constructed MOB_NBR-ADV message to an MS, when the serving BS has too much neighbor BS information to transmit to the MS and thus the MOB_NBR-ADV message to be transmitted to the MS is too large. Also, the present invention can be applied to formation and transmission of all broadcast messages exchanged between a BS and an MS as well as the MOB_NBR-ADV message.

For convenience, the following description is based on an assumption that a BWA communication system according to preferred embodiments of the present invention is an IEEE 802.16e communication system which uses an Orthogonal Frequency Division Multiplexing (OFDM) scheme and an Orthogonal Frequency Division Multiple Access (OFDMA) scheme. Because the IEEE 802.16e communication system uses an OFDM/OFDMA scheme, it can transmit physical channel signals by using a plurality of sub-carriers, thereby achieving high speed data transmission. Also, the IEEE 802.16e communication system supports a multi-cell structure and the mobility of an MS.

Figure 1:
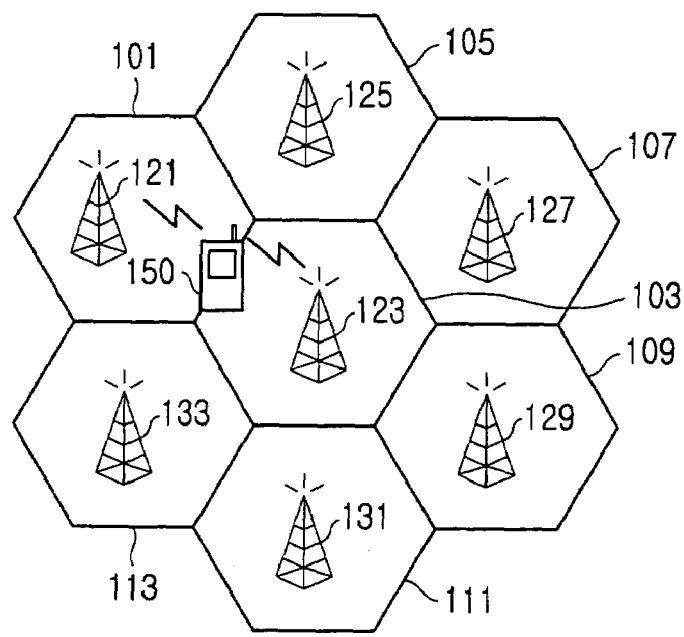
FIG. 1 illustrates a structure of a BWA communication system according to an embodiment of the present invention, which supports handoff of an MS moving between cells controlled by BSs supporting different operation modes.

FIG. 1 illustrates a structure of a BWA communication system according to an embodiment of the present invention, which supports handoff of an MS moving between cells controlled by BSs supporting different operation modes.

Referring to FIG. 1, the BWA communication system has a multi-cell structure including cell 1 101, cell 2 103, cell 3 105, cell 4 107, cell 5 109, cell 6 111, and cell 7 113. Also, the BWA communication system includes BSs 121, 123, 125, 127, 129, 131, 133 and an MS 150. The BSs 121, 123, 125, 127, 129, 131, 133 control the cells 101, 103, 105, 107, 109, 111, 113, respectively. The MS 150 can receive services from the BSs 121, 123, 125, 127, 129, 131, 133 while moving between the cells 101, 103, 105, 107, 109, 111, 113. The signal exchange between the MS 150 and the BSs 121, 123, 125, 127, 129, 131, 133 uses the OFDM/OFDMA scheme.

When the MS 150 moves from cell 1 101 controlled by BS 1 121 to cell 2 103 controlled by BS 2 123, the serving BS (the BS which is currently providing a service to the MS 150) changes from BS 1 121 to BS 2 123, and BS 1 121 (the current serving BS) broadcasts a MOB_NBR-ADV message that includes BS information of neighbor cells to the MS 150. Upon receiving the MOB_NBR-ADV message, the MS 150 obtains the BS information of neighbor cells in advance. Then, as soon as the MS 150 gets the channel information of BS 2 123, the MS 150 starts a process for setting up a connection with BS 2 123, thereby performing a handoff process. That is, BS 1 121 (the current serving BS) broadcasts a MOB_NBR-ADV message in order to preliminarily send neighbor BS information (i.e. information of BS 2 123) to the MS 150 moving to cell 2 103, and the MS 150 recognizes the information of BS 2 123 from the received MOB_NBR-ADV message. As a result, the BWA communication system supports handoff of the MS 150.

In a BWA communication system having the structure described above, the serving BS inserts the neighbor BS information in the MOB_NBR-ADV message in order to transmit the neighbor BS information to the MS. Table 1 below shows the format of the MOB_NBR-ADV message.

TABLE 1

| Syntax | Size | Notes |
|---|---|---|
| MOB_NBR-ADV_Message_Format( ) { | | |
| Management Message Type = 49 | 8 bits | |
| Operator ID | 24 bits | Unique ID assigned to the operator |
| Fragmentation Index | 4 bits | Current Fragmentation Index |
| Total Fragmentation | 4 bits | Total number of fragmentation |
| N_NEIGHBORS | 8 bits | |
| For (j=0; j<N_NEIGHBORS; j+ +) { | | |
| Neighbor BS ID | 48 bits | |
| PHY Profile ID | 32 bits | |

TABLE 1-continued

| Syntax | Size | Notes |
| --- | --- | --- |
| Configuration Change Count | 8 bits | Incremented each time the information for the associated neighbor BS has changed |
| TLV Encoded Neighbor information } | Variable | TLV specific |
| HMAC Tuple } | 21 | Bytes See 11.4.11 |

As shown in Table 1, the MOB_NBR-ADV message includes a plurality of Information Elements (IEs), which include a 'Management Message Type' field of 8 bits which represents the type of transmitted/received message (Management Message Type=49), an 'Operator ID' field of 24 bits which is assigned for identification of an operator, represents an identifier (ID) of the operator, and can be shared by a group of BSs, an 'N_NEIGHBOR' field of 8 bits which represents the number of neighbor BSs, an 'HMAC Tuple' field of 21 bits, and information of all of the neighbor BSs. Further, the MOB_NBR-ADV message includes a 'Fragmentation Index' field and a 'Total Fragmentation' field, each of which has a size of 4 bits and represents 'Neighbor Set' of neighbor BSs.

That is, the 'Neighbor Set' field of the neighbor BSs is divided into the 'Fragmentation Index' field of 4 bits, which represents an index of the current fragmented MOB_NBR-ADV message transmitted by the current frame among all of the fragmented MOB_NBR-ADV messages, and the 'Total Fragmentation' field which represents the number of all of the fragmented MOB_NBR-ADV messages, i.e. the number of all fragments divided from the entire MOB_NBR-ADV message.

Figure 2:
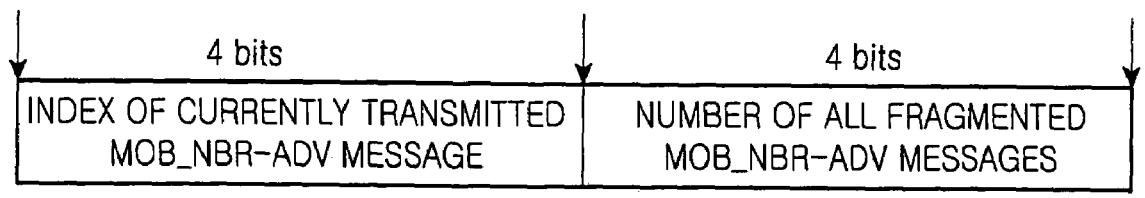
FIG. 2 illustrates a format of a MOB_NBR-ADV message proposed in a BWA communication system according to an embodiment of the present invention.

FIG. 2 illustrates a format of a MOB_NBR-ADV message including the newly added fragmentation information described above, i.e. the 'Fragmentation Index' field representing an index of the currently transmitted fragmented MOB_NBR-ADV message and the 'Total Fragmentation' field representing the number of all the fragmented MOB_NBR-ADV messages. Referring to FIG. 2, when the serving BS has too much neighbor BS information and a MOB_NBR-ADV message which cannot be transmitted in one frame, the serving BS divides the MOB_NBR-ADV message into fragmented MOB_NBR-ADV messages of a size which can be carried by one frame, inserts the number of all of the fragmented MOB_NBR-ADV messages into the 'Total Fragmentation' field and an index of a fragmented MOB_NBR-ADV message transmitted by a current frame into the 'Fragmentation Index' field, and then transmits the information-inserted message. When the MOB_NBR-ADV message has been divided into more than one fragmented MOB_NBR-ADV message, the serving BS sequentially transmits to the MS all of the fragmented MOB_NBR-ADV messages by corresponding frames. In this case, the 'Fragmentation Index' field represents indices of neighbor BSs also included in the fragmented MOB_NBR-ADV message transmitted by the current frame, so that the MS can differentiate the fragmented MOB_NBR-ADV message transmitted by the current frame from the other fragmented MOB_NBR-ADV messages. Further, because the 'Total Fragmentation' field represents the number of all of the fragmented MOB_NBR-ADV messages transmitted to the MS, the MS can determine if there is any more fragmented MOB_NBR-ADV message to be transmitted by another frame after the current frame. Through the 'Total Fragmentation' field, the MS can recognize the number of frames for carrying the entire MOB_NBR-ADV message and can receive all of the fragmented MOB_NBR-ADV messages transmitted through the corresponding number of frames, thereby acquiring the information of all of the neighbor BSs.

Further, the 'N_NEIGHBORS' field includes a 'Neighbor BS ID' field of 48 bits representing IDs of the neighbor BSs, a 'PHY Profile ID' field of 32 bits representing downlink physical frequencies of the neighbor BSs, a 'Configuration Change Count' field of 8 bits representing a change count for the configuration of the MOB_NBR-ADV message, and a 'TLV Encoded Neighbor information' field of variable bits representing TLV-encoded information of the neighbor BSs.

In a BWA communication system according to an embodiment of the present invention, the MS can obtain information of neighbor BSs by receiving the MOB_NBR-ADV message including the field as described above from the serving BS, and the MS can easily perform handoff when moving to another cell because the MS preliminarily obtains information of the BS controlling the other cell to which the MS will move. Therefore, the BWA communication system according to the present invention supports handoff of an MS. Further, in the BWA communication system, the MOB_NBR-ADV message includes the 'Fragmentation Index' field and the 'Total Fragmentation' field. Therefore, when the MOB_NBR-ADV message is too large to be sent to the MS in one frame, the MOB_NBR-ADV message is divided into fragmented messages each having a size transmittable in one frame, so that the fragmented messages can be transmitted to the MS in more than one frame. Therefore, according to the present invention, even when the serving BS has too much neighbor BS information and a MOB_NBR-ADV message is to large to transmit, the serving BS can fragment the MOB_NBR-ADV message and then transmit the fragmented MOB-_NBR-ADV messages to the MS and the MS can preliminarily get the neighbor BS information by receiving the fragmented MOB_NBR-ADV messages.

Table 2 shows a format of the MOB_NBR-ADV message including information of neighbor BSs transmitted from a serving BS to an MS in a BWA communication system according to another embodiment of the present invention.

TABLE 2

| Syntax | Size | Notes |
|---|---|---|
| MOB_NBR-ADV_Message_Format( ) { | | |
| Management Message Type = 49 | 8 bits | |
| Operator ID | 24 bits | Unique ID assigned to the operator |
| Configuration Change Count | 8 bits | Incremented each time the information for the associated neighbor BS has changed |
| Fragmentation Mode | 1 bit | 0: Remaining fragment indicate mode<br>1: Total neighbor indicate mode |
| If (Fragmentation Mode == 1){ | | |
| TOT_N_NEIGHBORS | 7 bits | |
| } else { | | |
| Start bit | 1 bit | Set to 1 when the message is the first fragment. |
| Number of Remaining Fragments | 6 bits | |
| } | | |
| N_NEIGHBORS | 8 bits | |
| For (j=0; j<N_NEIGHBORS; j++) { | | |
| Length | 8 bits | Length of message information within the iteration of N_NEIGHBOR in bytes. |
| Neighbor BS-ID | 48 bits | |
| Preamble Index | 8 bits | The index for the PHY profile specific preamble.<br>Preamble Index is PHY specific for SCa and OFDMA. The value of Preamble Index shall be ignored and a value of '0x00' shall be used for OFDM PHY |
| PHY Profile ID | 16 bits | TBD |
| HO Process Optimization | 8 bits | |
| DCD Configuration Change Count | 8 bits | This represents the Neighbor BS current DCD configuration change count |
| UCD Configuration Change Count | 8 bits | This represents the Neighbor BS current UCD configuration change count |
| TLV Encoded Neighbor information | Variable | TLV specific |
| } | | |
| } | | |

As shown in Table 2, the MOB_NBR-ADV message includes a plurality of IEs, which include a 'Management Message Type' field of 8 bits which represents the type of transmitted/received message (Management Message Type=49), an 'Operator ID' field of 24 bits which is assigned for identification of an operator, represents an identifier (ID) of the operator, and can be shared by a group of BSs, a 'Configuration Change Count' field of 8 bits representing a change count for the configuration of the MOB_NBR-ADV message, and a 'PHY Profile ID' field which represents physical layer information of the BS and includes a Co-located FA indicator bit, an FA Configuration indicator bit, a Time/Frequency Synchronization Indicator, a BS EIRP Indicator, a DCD/UCD Reference Indicator, an FA Index Indicator and an FA number.

When the MOB_NBR-ADV message having the format as described above is too large to be transmitted in one frame, that is, when it is impossible to transmit all of the neighbor BS information in one frame, the serving BS may divide the MOB_NBR-ADV message into fragmented messages each having a size transmittable in one frame in order to transmit the MOB_NBR-ADV message to the MS. Further, when the MOB_NBR-ADV message is transmitted to the MS after being fragmented, each transmitted fragment of the MOB_NBR-ADV message must indicate that the MOB_NBR-ADV message has been fragmented. Also, when the MS has received one fragment of the MOB_NBR-ADV message indicating that the MOB_NBR-ADV message has been fragmented, the MS can receive directly after the first fragment information of all of the neighbor BSs by receiving all of the other fragments of the MOB_NBR-ADV message transmitted by the frames.

In order to indicate that the MOB_NBR-ADV message has been fragmented, it is necessary for the MOB_NBR-ADV message to include the following fields. That is, the MOB_NBR-ADV message includes a 'Fragmentation Mode' field of 1 bit representing the fragmentation mode, a 'TOT_N_NEIGHBORS' field of 7 bits representing the number of all of the neighbor BSs, a 'Start bit' field of 1 bit representing the start bit of the fragmented MOB_NBR-ADV message, and a 'Number of Remaining Fragments' field of 6 bits representing the number of remaining fragmented MOB_NBR-ADV messages to be transmitted by frames directly after the frame carrying the very fragmented MOB_NBR-ADV message.

By the above-mentioned fields, it is noted that the MOB_NBR-ADV message can be fragmented according to two types of fragmentation modes. The 'Fragmentation Mode' field of the MOB_NBR-ADV message represents the type of indicating the fragmentation of the MOB_NBR-ADV message. When the fragmentation of the MOB_NBR-ADV message is expressed by the number of all of the neighbor BSs, i.e. by the quantity of neighbor BS information, the indication type is expressed in the 'TOT_N_NEIGHBORS' field and the 'Fragmentation Mode' field is set to '1'. Further, when the fragmentation of the MOB_NBR-ADV message is expressed by the number of the fragmented MOB_NBR-ADV messages, the 'Fragmentation Mode' field is set to '0'.

When the 'Fragmentation Mode' field has been set to '1', the 'TOT_N_NEIGHBORS' field represents the number of all of the neighbor BSs to which the serving BS broadcasts the MOB_NBR-ADV message, and the 'N_NEIGHBORS' field of 8 bits represents the number of the neighbor BSs of which BS information is transmitted by the fragmented MOB_NBR-ADV message, i.e. the quantity of the neighbor BS information. When the number of neighbor BSs of which BS information is transmitted by the 'N_NEIGHBORS' field of the fragmented MOB_NBR-ADV message, i.e. the quantity of the neighbor BS information, is less than the number of all of the neighbor BSs transmitted by the 'TOT_N_NEIGHBORS' field, i.e. the quantity of all of the neighbor BS information, the MS must continue to receive the remaining fragmented MOB_NBR-ADV messages in order to obtain information of the remaining neighbor BSs.

Meanwhile, the 'Fragmentation Mode' field has been set to '0', it is necessary to differentiate the fragmented MOB_NBR-ADV messages. Therefore, the 'Start bit' field represents transmission of the first fragmented MOB_NBR-ADV message and is set to '1' in the first fragmented MOB_NBR-ADV message. In other words, the 'Start bit' field is set to '0' in the other fragmented MOB_NBR-ADV messages than the first fragmented MOB_NBR-ADV message. The 'Number of Remaining Fragments' field represents the number of the other fragmented MOB_NBR-ADV messages which the MS must receive.

Further, the MOB_NBR-ADV message includes a 'TLV Encoded Neighbor information' field of variable bits representing TLV-encoded information of the neighbor BSs, a 'DCD Configuration Change Count' field representing a Downlink Channel Descriptor (DCD) change count for configuration of the MOB_NBR-ADV message, a 'UCD Configuration Change Count' field representing an Uplink Channel Descriptor (UCD) change count for configuration of the MOB_NBR-ADV message, a 'Length' field of 8 bits representing the length of the neighbor BS information included in the 'N_NEIGHBOR' field, a 'Neighbor BS-ID' field of 48 bits representing the IDs of the neighbor BSs, a 'Preamble Index' field of 8 bits representing the preamble index, and an 'HO Process Optimization' field of 8 bits representing optimization of the handoff process.

Hereinafter, a method for fragmenting the MOB_NBR-ADV message including the neighbor BS information into fragmented MOB_NBR-ADV messages each having a size able to be transmitted in one frame, which uses a configuration of newly defined MOB_NBR-ADV messages, will be described.

Figure 3:
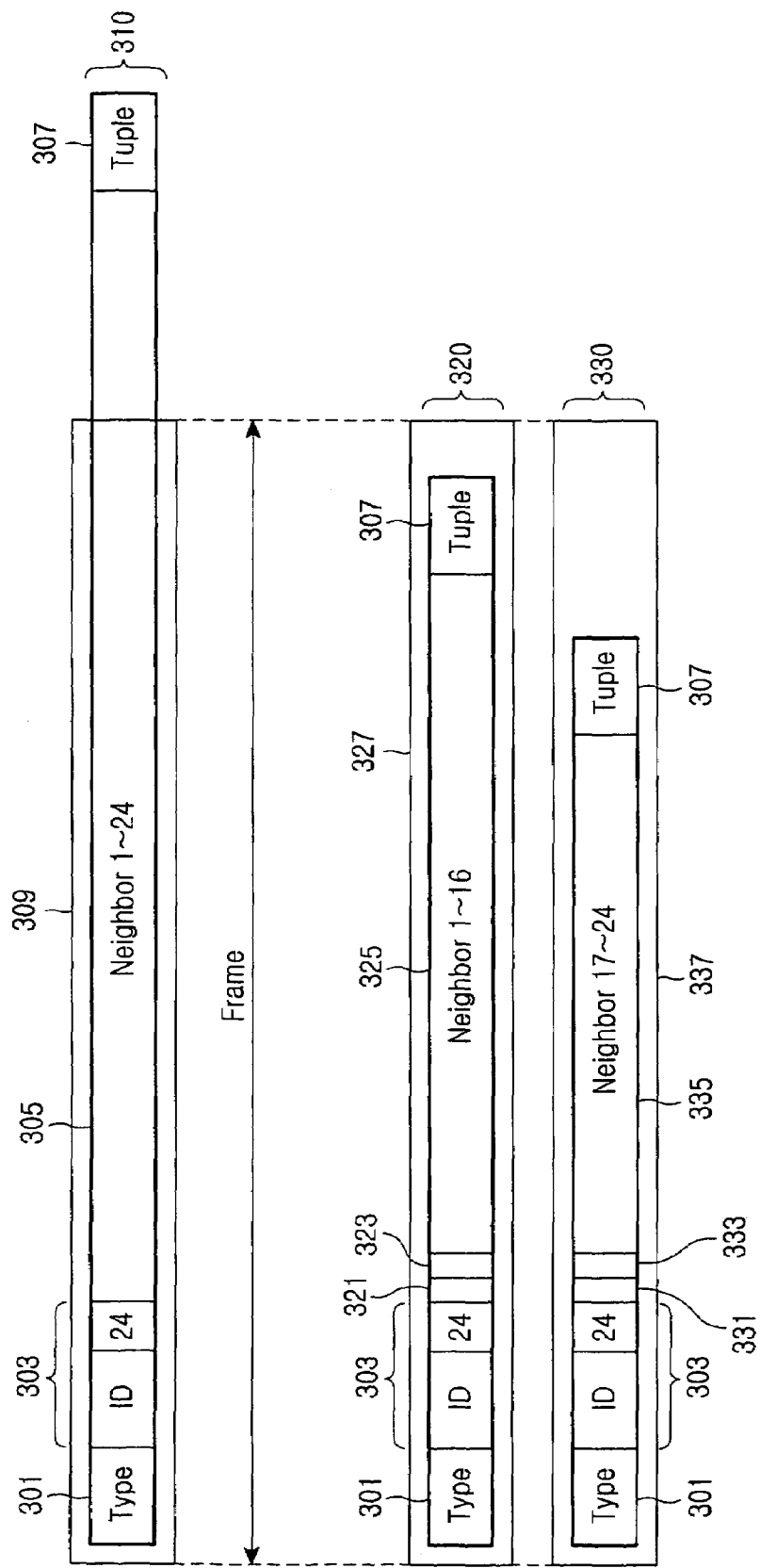
FIG. 3 illustrates a method of fragmentation of the MOB_NBR-ADV message according to an embodiment of the present invention.

FIG. 3 illustrates a method of fragmenting the MOB_NBR-ADV message into fragmented MOB_NBR-ADV messages each having a size transmittable in one frame according to an embodiment of the present invention.

Referring to FIG. 3, when the serving BS has too many neighbor BSs and too much neighbor BS information, the original MOB_NBR-ADV message 310 has a size exceeding a preset size of one frame 309. When the original MOB_NBR-ADV message 310 has a size exceeding a preset size of one frame 309, it is impossible to transmit the original MOB_NBR-ADV message 310 in one frame 309.

However, in the present invention as described above, the original MOB_NBR-ADV message 310 is fragmented into a first MOB_NBR-ADV message 320 and a second MOB_NBR-ADV message 330. The original MOB_NBR-ADV message 310 includes a 'Management Message Type' field 301 representing the type of the message, an 'Operator ID' field 303 representing the ID of the operator, a field 305 representing information of the neighbor BSs and including the 'N_NEIGHBORS' field representing the number of all neighbor BSs transmitted by one frame 309, and an 'HMAC Tuple' field 307. As described herein, it is assumed that the number of neighbor BSs included in the 'N_NEIGHBORS' field of the original MOB_NBR-ADV message 310 is 24 and the field 305 representing information of the neighbor BSs and including the 'N_NEIGHBORS' field includes information of 24 neighbor BSs.

According to the present invention, the original MOB_NBR-ADV message 310 is fragmented into fragmented messages each having a size not exceeding the size of one frame 327, for example, into the first MOB_NBR-ADV message 320 and the second MOB_NBR-ADV message 330. The first MOB_NBR-ADV message 320, one of the fragmented messages, includes the 'Management Message Type' field 301 representing the same message type as that included in the original MOB_NBR-ADV message 310, the 'Operator ID' field 303 representing the ID of the operator and the 'HMAC Tuple' field 307.

Further, the first MOB_NBR-ADV message 320 includes a 'Fragmentation Index' field 321, a 'Total Fragmentation' field 323 and a field 325 representing information of the neighbor BSs and including the 'N_NEIGHBORS' field representing the number of all of the neighbor BSs included in the first MOB_NBR-ADV message 320. The 'Fragmentation Index' field 321 represents an index of the first MOB_NBR-ADV message 320 which is transmitted by the current frame 327, which represents that the MOB_NBR-ADV message transmitted by the current frame 327 from among the fragmented MOB_NBR-ADV messages (i.e. the first MOB_NBR-ADV message 320 and the second MOB_NBR-ADV message 330) is the first MOB_NBR-ADV message 320. The 'Total Fragmentation' field 323 represents the number of all of the fragmented MOB_NBR-ADV messages fragmented from the original MOB_NBR-ADV message 310 (in the case of FIG. 3, the 'Total Fragmentation' field 323 is set to '2', because the first MOB_NBR-ADV message 320 and the second MOB_NBR-ADV message 330 are all of the fragmented MOB_NBR-ADV messages). As used herein, it is assumed that the 'N_NEIGHBORS' field of the first MOB_NBR-ADV message 320 includes 16 BSs so that the first MOB_NBR-ADV message 320 has a size not exceeding the size of the current frame 327. Therefore, the field 325 representing information of the neighbor BSs and including the 'N_NEIGHBORS' field includes 16 pieces of neighbor BS information.

Further, the second MOB_NBR-ADV message 330 is transmitted to the MS by the next frame 337 directly after the first MOB_NBR-ADV message 320 is transmitted to the MS by the current frame 327. The second MOB_NBR-ADV message 330 includes the same 'Management Message Type' field 301 as that include in the first MOB_NBR-ADV message 320, the 'Operator ID' field 303 representing the ID of the operator and the 'HMAC Tuple' field 307. Further, the second MOB_NBR-ADV message 330 includes a 'Fragmentation Index' field 331 representing that the MOB_NBR-ADV message transmitted by the next frame 337 from among the fragmented MOB_NBR-ADV messages (i.e. the first MOB_NBR-ADV message 320 and the second MOB_NBR-ADV message 330) is the second MOB_NBR-ADV message 330.

As does the first MOB_NBR-ADV message 320, the second MOB_NBR-ADV message 330 further includes a 'Total Fragmentation' field 333 and a field 335 representing information of the neighbor BSs and including the 'N_NEIGHBORS' field representing the number of all of the neighbor BSs included in the second MOB_NBR-ADV message 330. The 'Total Fragmentation' field 333 represents the number of all of the fragmented MOB_NBR-ADV messages fragmented from the original MOB_NBR-ADV message 310 (in the case of FIG. 3, the 'Total Fragmentation' field 333 is set to '2', because the first MOB_NBR-ADV message 320 and the second MOB_NBR-ADV message 330 are all of the fragmented MOB_NBR-ADV messages). According to the assumption that the 'N_NEIGHBORS' field of the first MOB_NBR-ADV message 320 includes 16 BSs so that the first MOB_NBR-ADV message 320 has a size not exceeding the size of the current frame 327, 16 pieces of neighbor BS information have already been transmitted to the MS by the first MOB_NBR-ADV message 320. As a result, the 'N_NEIGHBORS' field of the second MOB_NBR-ADV message 330 transmitted to the MS by the next frame 337 includes 8 BSs remaining after transmission of the first MOB_ NBR-ADV message 320 and the field 335 representing information of the neighbor BSs and including the 'N_NEIGHBORS' field includes 8 pieces of neighbor BS information.

Although the above description is based on an assumption that the first MOB_NBR-ADV message 320 includes 16 pieces of neighbor BS information so that the first MOB_NBR-ADV message 320 has a size not exceeding the size of the current frame 327, the first MOB_NBR-ADV message 320 may include a different number of neighbor BSs, which changes the number of neighbor BSs included in the second MOB_NBR-ADV message 330. Further, according to the present invention, when the second MOB_NBR-ADV message 330 has a size greater than that of the next frame 337, the original MOB_NBR-ADV message 310 may be fragmented into three or more fragmented MOB_NBR-ADV messages and the fragmented MOB_NBR-ADV messages may be transmitted to the MS by frames the number of which corresponds to the number of the fragmented MOB_NBR-ADV messages.

In this case, each of the fragmented MOB_NBR-ADV messages includes the fields as described above. When the serving BS fragments the MOB_NBR-ADV message, the fragmentation is based on the size of one frame so that each of the fragmented MOB_NBR-ADV messages has a size not greater than the size of one frame and the number of BSs included in the field representing the neighbor BS information and including the 'N_NEIGHBORS' field does not exceed the number of BSs transmittable in one frame. Further, each of the fragmented MOB_NBR-ADV messages commonly includes a 'Management Message Type' field having the same value, an 'Operator ID' field representing an ID of an operator, and an 'HMAC Tuple' field.

Further, the serving BS inserts the number of fragmented MOB_NBR-ADV messages into the 'Total Fragmentation' field, inserts an index of the current fragmented MOB_NBR-ADV message transmitted by the current frame into the 'Fragmentation Index' field, inserts information of neighbor BSs into the corresponding field, and then transmits the current fragmented MOB_NBR-ADV message to the MS.

Although the above description discusses the case of broadcasting the MOB_NBR-ADV message in order for a serving BS to notify neighbor BS information to an MS, the present invention can be applied to the formation and transmission of other broadcast messages from the serving BS to the MS as well as the MOB_NBR-ADV message. Hereinafter, an operation of a serving BS for forming and transmitting a broadcast message including neighbor BS information will be described.

Figure 4:
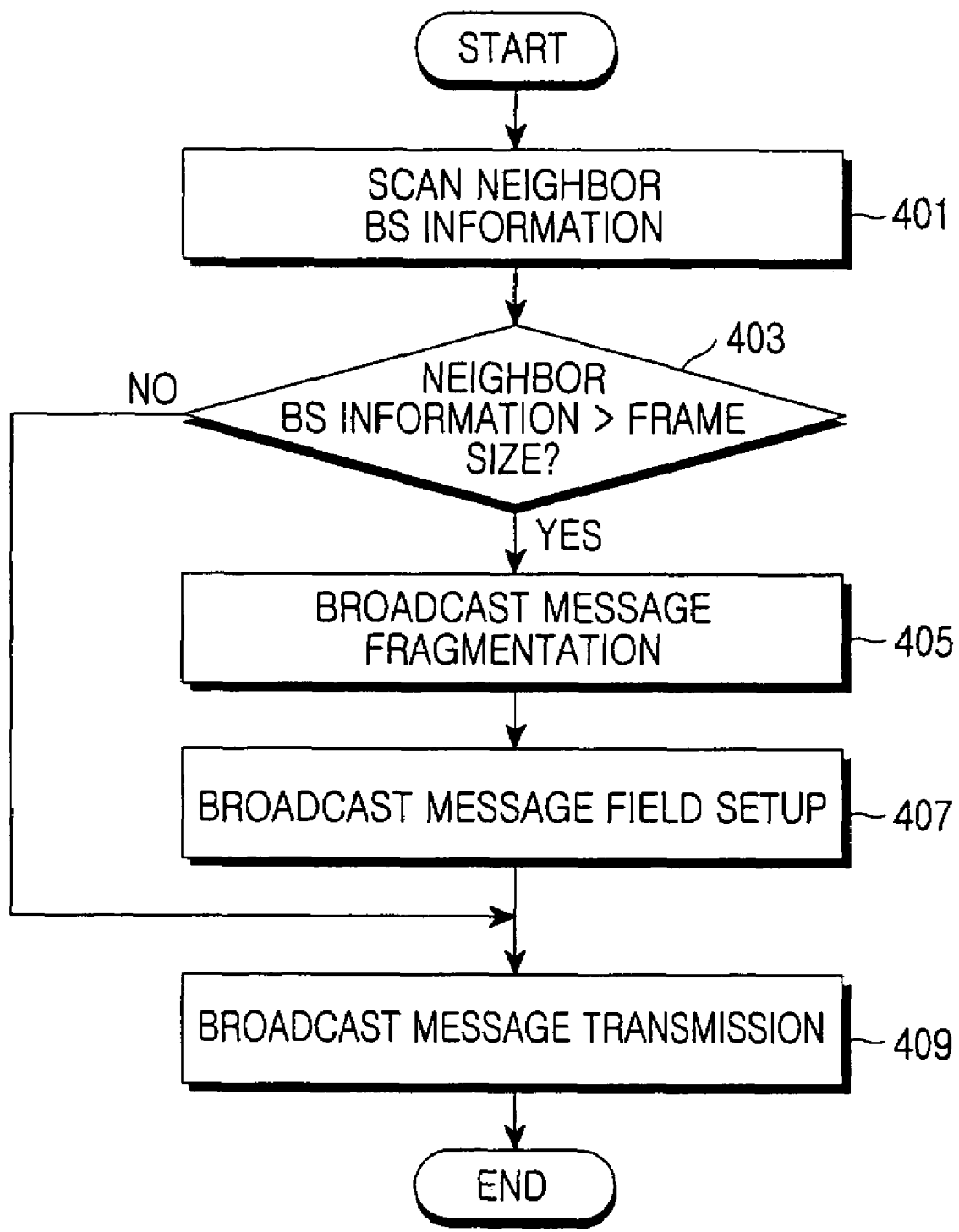
FIG. 4 is a flowchart of a process according to an embodiment of the present invention, in which a serving BS forms and transmits/receives a broadcast message including neighbor BS information.

FIG. 4 is a flowchart of a process according to an embodiment of the present invention, in which a serving BS forms and transmits a broadcast message including information of neighbor BSs.

In step 401, the serving BS scans and collects information of neighbor BSs to transmit to an MS. In step 403, the serving BS compares the collected information of neighbor BSs with the size of the frame for carrying the collected information of neighbor BSs to the MS. When the collected information of neighbor BSs has a size not greater than the size of one frame, the serving BS proceeds to step 409, in which the serving BS constructs a broadcast message including the collected information and transmits the constructed broadcast message to the MS in one frame. Upon receiving the broadcast message through one frame, the MS obtains the information of the neighbor BSs included in the broadcast message. Therefore, the BWA system supports the handoff of the MS.

When the collected information of neighbor BSs has a size greater than the size of one frame as a result of the determination in step 403, the serving BS proceeds to step 405, in which the serving BS divides the broadcast message including the collected information into fragmented broadcast messages each having a size not greater than the size of the frame.

Then, in step 407, the serving BS sets up the fields constituting the fragmented broadcast message. For example, when the broadcast message has been divided into two fragmented MOB_NBR-ADV messages in step 405, the 'Total Fragmentation' fields of the two fragmented MOB_NBR-ADV messages as shown in Table 1, which represent the number of all of the fragmented MOB_NBR-ADV messages, are set to have the same binary value of '0010'. Further, the 'Fragmentation Index' field of the first fragmented MOB_NBR-ADV message from among the two fragmented MOB_NBR-ADV messages, which represents an index of the first fragmented MOB_NBR-ADV message carried by the first frame, is set to have a value of '0001', and the 'Fragmentation Index' field of the second fragmented MOB_NBR-ADV message carried by the second frame is set to have a value of '0010'. Then, in step 409, the serving BS transmits the fragmented broadcast message including the setup fields to the MS in the corresponding frame. When the broadcast message has been divided into two fragmented broadcast messages, the serving BS transmits the two fragmented broadcast messages in two frames.

The MS sequentially receives the fragmented broadcast messages as described above in the corresponding number of frames. Specifically, when the received broadcast messages are fragmented MOB_NBR-ADV messages, the MS recognizes the field values of the fragmented MOB_NBR-ADV messages and checks the value of the 'Total Fragmentation' field representing the number of all of the fragmented MOB_NBR-ADV messages, thereby determining if the MOB_NBR-ADV message transmitted by the current frame is a fragmented MOB_NBR-ADV message.

For example, when the 'Total Fragmentation' field of the currently received MOB_NBR-ADV message has a value of '0000', it implies the currently received MOB_NBR-ADV message is not a fragmented MOB_NBR-ADV message. Further, the MS can obtain information of neighbor BSs from the currently received MOB_NBR-ADV message by decoding the currently received MOB_NBR-ADV message. When the 'Total Fragmentation' field of the currently received MOB_NBR-ADV message has any value other than '0000', the MS recognizes the number of all the fragmented MOB_NBR-ADV messages from the value of the 'Total Fragmentation' field and waits for reception of the next fragmented MOB_NBR-ADV message to be transmitted in the next frame. That is, the MS receives the fragmented MOB_NBR- ADV messages by sequentially transmitted multiple frames and obtains information of neighbor BSs by decoding the received fragmented MOB_NBR-ADV messages. Also, the MS can obtain information of all of the neighbor BSs broadcast by the serving BS, by receiving all of the fragmented MOB_NBR-ADV messages.

In a BWA communication system according to the present invention as described above, a serving BS can collect information of neighbor BSs, form a broadcast message including the information of the neighbor BSs, and fragment the broadcast message if the broadcast message is too large. Therefore, the serving BS can transmit a large amount of neighbor BS information to the MS. As a result, a BWA communication system according to the present invention can support handoff of an MS moving between cells because it is possible to transmit a large amount of neighbor BS information to the MS in the system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for broadcasting information of neighbor base stations by a base station in a communication system, the method comprising the steps of:
    setting a value of each of a plurality of fields included in each of m fragments of the information of neighbor base stations; and
    broadcasting each of the m fragments of the information of neighbor base stations at a predetermined time for each fragment,
    wherein the communication system is a Broadband Wireless Access (BWA) communication system which uses an Orthogonal Frequency Division Multiple Access (OFDMA) scheme using a plurality of sub-carriers, and supports a multi-cell structure and a mobility of a mobile station so that the mobile station obtains the information of neighbor base stations by receiving the information of neighbor base stations from a serving base station, and the mobile station may perform a handoff process on moving to another cell after preliminarily obtaining the information of neighbor base stations,
    wherein the m fragments are generated by fragmenting a broadcast message including the information of neighbor base stations into m fragments, and wherein the plurality of fields include in each of the m fragments a first field, a second field, and a third field, the first field indicates a fragmentation index for a current fragment, the second field indicates a total number of fragments equal to m, where m is an integer greater than or equal to 1, and the third field indicates a number of neighbor base stations included in the current fragment,
    wherein the current fragment includes identifiers of the neighbor base stations included in the current fragment,
    wherein the current fragment includes information of physical frequencies for the neighbor base stations included in the current fragment,
    wherein the plurality of fields include an operator ID field and a configuration change count field which is incremented each time information for an associated neighbor base station has changed, and
    wherein the plurality of fields include a Downlink Channel Descriptor (DCD) Configuration Change Count field representing a DCD change count for the neighbor base stations included in the current fragment, and a Uplink Channel Descriptor (UCD) Configuration Change Count field representing a UCD change count for the neighbor base stations included in the current fragment.

2. The method as claimed in claim 1 wherein the plurality of fields include a preamble index representing a preamble index and a handoff optimization field representing optimization of the handoff process for an associated neighbor base station.

3. A method for receiving information of neighbor base stations by a mobile station in a communication system, the method comprising the step of:
    receiving m fragments of the information of neighbor base stations from a base station at a predetermined time for each fragment,
    wherein the communication system is a Broadband Wireless Access (BWA) communication system which uses an Orthogonal Frequency Division Multiple Access (OFDMA) scheme using a plurality of sub-carriers, and supports a multi-cell structure and a mobility of the mobile station so that the mobile station obtains the information of neighbor base stations by receiving the information of neighbor base stations from a serving base station, and the mobile station may perform a handoff process on moving to another cell after preliminarily obtaining the information of neighbor base stations,
    wherein the m fragments are generated, by the base station, by fragmenting a broadcast message including the information of neighbor base stations into m fragments, and wherein a plurality of fields include in each of the m fragments a first field, a second field, and a third field, the plurality of fields are included in each of the m fragments of the information of neighbor base stations, the first field indicates a fragmentation index for a current fragment, the second field indicates a total number of fragments equal to m, where m is an integer greater than or equal to 1, and the third field indicates a number of neighbor base stations included in the current fragment,
    wherein the current fragment includes identifiers of the neighbor base stations in the information of the current fragment included in the current fragment,
    wherein the current fragment includes information of physical frequencies for the neighbor base stations included in the current fragment,
    wherein the plurality of fields include an operator ID field and a configuration change count field which is incremented each time information for an associated neighbor base station has changed, and
    wherein the plurality of fields include a Downlink Channel Descriptor (DCD) Configuration Change Count field representing a DCD change count for the neighbor base stations included in the current fragment, and a Uplink Channel Descriptor (UCD) Configuration Change Count field representing a UCD change count for neighbor base stations included in the current fragment.

4. The method as claimed in claim 3, wherein the plurality of fields include a preamble index representing a preamble index and a handoff optimization field representing optimization of the handoff process for an associated neighbor base station.

5. A system for broadcasting information of neighbor base stations in a communication system, the system comprising:
    a base station for setting a value of each of a plurality of fields included in each of m fragments of the information of neighbor base stations, and broadcasting each of the m fragments of the information of neighbor base stations at a predetermined time for each fragment, wherein the communication system is a Broadband Wireless Access (BWA) communication system which uses an Orthogonal Frequency Division Multiple Access (OFDMA) scheme using a plurality of sub-carriers, and supports a multi-cell structure and a mobility of a mobile station so that the mobile station obtains the information of neighbor base stations by receiving the information of neighbor base stations from a serving base station, and the mobile station may perform a handoff process on moving to another cell after preliminarily obtaining the information of neighbor base stations, wherein the m fragments are generated by fragmenting a broadcast message including the information of neighbor base stations into m fragments, and wherein the plurality of fields include in each of the m fragments a first field, a second field, and a third field, the first field indicates a fragmentation index for a current fragment, the second field indicates a total number of fragments equal to m, where m is an integer greater than or equal to 1, and the third field indicates a number of neighbor base stations included in the current fragment, wherein the current fragment includes identifiers of the neighbor base stations included in the current fragment, wherein the current fragment includes information of physical frequencies for the neighbor base stations included in the current fragment, wherein the plurality of fields include an operator ID field and a configuration change count field which is incremented each time information for an associated neighbor base station has changed, and wherein the plurality of fields include a Downlink Channel Descriptor (DCD) Configuration Change Count field representing a DCD change count for the neighbor base stations included in the current fragment, and a Uplink Channel Descriptor (UCD) Configuration Change Count field representing a UCD change count for the neighbor base stations included in the current fragment.

6. The system as claimed in claim 5, wherein the plurality of fields include a preamble index representing a preamble index and a handoff optimization field representing optimization of the handoff process for an associated neighbor base station.

7. A system for receiving information of neighbor base stations in a communication system, the system comprising:
a mobile station for receiving each of m fragments of the information of neighbor base stations from a base station at a predetermined time for each fragment, wherein the communication system is a Broadband Wireless Access (BWA) communication system which uses an Orthogonal Frequency Division Multiple Access (OFDMA) scheme using a plurality of sub-carriers, and supports a multi-cell structure and a mobility of the mobile station so that the mobile station obtains the information of neighbor base stations by receiving the information of neighbor base stations from a serving base station, and the mobile station may perform a handoff process on moving to another cell after preliminarily obtaining the information of neighbor base stations, wherein the m fragments are generated, by the base station, by fragmenting a broadcast message including the information of neighbor base stations into m fragments, and wherein a plurality of fields include in each of the m fragments a first field, a second field, and a third field, the plurality of fields are included in each of the m fragments of the information of neighbor base stations, the first field indicates a fragmentation index for a current fragment, the second field indicates a total number of fragments equal to m, where m is an integer greater than or equal to 1, and the third field indicates a number of neighbor base stations included in the current fragment, wherein the current fragment includes identifiers of the neighbor base stations included in the current fragment, wherein the current fragment includes information of physical frequencies for the neighbor base stations included in the current fragment, wherein the plurality of fields include an operator ID field and a configuration change count field which is incremented each time information for an associated neighbor base station has changed, and wherein the plurality of fields include a Downlink Channel Descriptor (DCD) Configuration Change Count field representing a DCD change count for the neighbor base stations included in the current fragment, and a Uplink Channel Descriptor (UCD) Configuration Change Count field representing a UCD change count for the neighbor base stations included in the current fragment.

8. The system as claimed in claim 7, wherein the plurality of fields include a preamble index representing a preamble index and a handoff optimization field representing optimization of the handoff process for an associated neighbor base station.

* * * * *

UNITED STATES PATENT AND TRADEMARK OFFICE
CERTIFICATE OF CORRECTION

PATENT NO. : 7,653,393 B2 Page 1 of 1
APPLICATION NO. : 11/205738
DATED : January 26, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 272 days.

Signed and Sealed this

Twenty-eighth Day of December, 2010

David J. Kappos
*Director of the United States Patent and Trademark Office*